United States Patent [19]

Wittmann et al.

[11] Patent Number: 4,679,752
[45] Date of Patent: Jul. 14, 1987

[54] PAYLOAD DEPOLYMENT FROM SHUTTLE EMPLOYING AN EJECTION RESTRAINT DEVICE

[75] Inventors: Alois Wittmann, Palos Verdes; Theodore M. Isaacs; John R. Murphy, both of Fountain Valley, all of Calif.

[73] Assignee: Hughes Aircraft Company, Los Angeles, Calif.

[21] Appl. No.: 695,156

[22] Filed: Jan. 28, 1985

[51] Int. Cl.$^4$ .............................................. B64G 1/22
[52] U.S. Cl. ................... 244/158 R; 244/160
[58] Field of Search ............... 244/158 R, 159, 161, 244/160, 137 A

[56] References Cited

U.S. PATENT DOCUMENTS

| | | | |
|---|---|---|---|
| 4,324,374 | 4/1982 | Wittmann et al. | 244/158 R |
| 4,355,775 | 10/1982 | Ganssle | 244/158 R |
| 4,359,201 | 11/1982 | Thomson et al. | 244/158 R |
| 4,506,852 | 3/1985 | Adams et al. | 244/158 R |

*Primary Examiner*—Galen Barefoot
*Assistant Examiner*—Lynn M. Fiorito
*Attorney, Agent, or Firm*—S. M. Mitchell; M. J. Meltzer; A. W. Karambelas

[57] ABSTRACT

Apparatus for use in gyroscopically ejecting a spacecraft supported in the open end of a spacecraft supporting cradle. The invention comprises a separable ejection restraint mechanism attached between the cradle and the spacecraft. The mechanism restrains the thrust force applied to the spacecraft for a predetermined time period in order to dissipate undetermined forces acting upon the spacecraft prior to the ejection thereof. The mechanism comprises a separable resilient portion and a releasable clamp portion coupled thereto. The resilient portion comprises a spring loaded anchor rod arrangement while the releasable clamp portion comprises a spring loaded split ball clamp arrangement. The invention also contemplates the use of a flexible carrier coupled between the spacecraft and the cradle. The invention acts as a tether connected between the cradle and spacecraft which acts to establish a determinant state of force on the cargo and eliminate unwanted ejection-related problems prior to cargo deployment. In addition, the release of a single tether employed as the sole cargo release initiator minimizes the possible imparting of uncontrolled momentum to the cargo due to structural deformation energy.

10 Claims, 6 Drawing Figures

PAYLOAD DEPOLYMENT FROM SHUTTLE EMPLOYING AN EJECTION RESTRAINT DEVICE

BACKGROUND OF THE INVENTION

The present invention relates generally to arrangements for launching payloads, such as spacecraft or satellites from launch vehicles, and more particularly, to launching arrangements in which the payload is mechanically restrained prior to its gyroscopic ejection from the launch vehicle in order to dissipate unwanted forces.

A publication entitled "Syncom IV Space Shuttle Orbital Flight Test Mission," publication number SCG 66710V/Dec. 1976 describes an arrangement for launching a spacecraft from a launch vehicle. The arrangement comprises a U-shaped or open-ended cradle having an ejection spring mechanism located on one side thereof for pushing against a small trunion that protrudes from one side of the spacecraft. A pivot point is formed on the opposite side of the spacecraft which also has a protruding trunion that rests on a mating surface formed in the cradle.

Although not described in this publication, it is necessary that both the spring mechanism and the pivot point lie in a plane normal to the spin axis of the spacecraft. Ideally, the plane also passes through the center of mass of the spacecraft. Release of the ejection spring mechanism applies a tangential thrust force, acting in the plane, to the spacecraft. Assuming the geometry of the structure is precise, when the spacecraft tangential thrust force is applied, the spacecraft rotates about the pivot point, simultaneously producing translational and rotational movement of the spacecraft without nutation as it leaves the cradle.

After the ejection force ceases, the spacecraft free body motion is a rolling motion up an imaginary ramp, thus maintaining the imparted linear and angular momentum. The separation velocity and rotational speed of the spacecraft depend on its inertia characteristics, diametral dimensions, ejection force and ejection stroke length.

The payload deployment system described in U.S. Pat. No. 4,359,201 entitled "Payload Deployment From Shuttle with Linear and Angular Velocity," assigned to the assignee of the present invention is an improvement over the system described in the above-cited publication. The deployment system described in this patent utilizes a single point ejection force for simple payload deployment mechanization. The force application and spacecraft/cradle reaction points enclose the payload center of mass and center of percussion. This minimizes the need for elaborate hold-down mechanisms at the force reaction points and for precise alignment of the push-off force with the center of mass and the reaction pivot point.

Structurally this involves, at a minimum, a pair of spaced pivot points on one side of the spacecraft and a force application point on the other side supporting the spacecraft in the open end of the cradle. These points define a triangle which encloses the center of mass of the spacecraft. Such a three-point suspension system defines the spacecraft attitude at separation from the launch vehicle. Rotation of the payload or spacecraft about fixed supports, such as the spaced pivot points, ensures physical clearance during the ejection phase of the launch as well as a well-defined deployment path. Also, the affects of spacecraft attitude disturbances due to liquid propellant sloshing are avoided while the spacecraft is being separated and in physical contact with the shuttle or launch vehicle.

Although the deployment system described in this patent has provided a significant improvement in payload launching systems, this design requires rather stiff structural supports, since the pivot points must support the payload structure. There is a possibility that thermal and gravity loads associated distortions of these stiff structures may cause a phenomenon known as "gapping" at the pivot points.

In addition, the phenomenon of "racking" may occur due to potentially large, statically indeterminant forces exerted on the payload at the moment of deployment by the stiff support structure. The use of a rigid support structure acts to compound the gapping and racking problems and also tends to cause "pivot bouncing" at the moment of deployment. These phenomena cause undesirable rotational effects which affect the attitude of the payload.

In typical deployment situations, several release mechanisms securing the spacecraft to the cradle are activated, after which forces were exerted on the spacecraft by the spring-loaded force actuator. The activation of these release mechanisms also created undesirable forces and moments to be exerted upon the spacecraft. It is therefore beneficial to eliminate these potential problems in order to have a well-controlled payload launch.

SUMMARY OF THE INVENTION

In order to improve upon prior art payload, or spacecraft, deployment systems, the present invention incorporates several concepts which provide for more precise and controlled spacecraft launches. The present invention is employed in apparatus used for the gyroscopic ejection of a spacecraft from a support structure. The support structure includes a spacecraft supporting cradle having an open end, and the spacecraft is positioned to straddle the open end.

The spacecraft has at least one attachment member on one side thereof and at least two attachment members on the opposite side thereof in longitudinally spaced positions. The attachment members releasably engage the cradle and support the spacecraft in the open end of said cradle. The attachment members generally define the corners of a triangle which encloses, with sufficient margin, the center of mass of the spacecraft. The apparatus also includes an ejecting mechanism having a part disposed between the cradle and the one attachment member to apply a tangential thrust force to one side of the spacecraft at the location of the one attachment member.

The present invention comprises a separable ejection restraint mechanism having one end attached to the cradle and the other end attached to the spacecraft. The ejection restraint mechanism restrains the thrust force applied to the spacecraft for a predetermined time period in order to dissipate undetermined forces acting upon the spacecraft prior to the ejection thereof. The ejection restraint mechanism comprises a separable resilient portion and a releasable clamp portion coupled thereto. The resilient portion comprises a spring loaded anchor rod arrangement while the releasable clamp portion comprises a spring loaded split ball clamp arrangement.

The present invention also contemplates the use of a flexible carrier coupled between the spacecraft and the cradle. The carrier includes the one attachment member on one side thereof and the two attachment members on the opposite side thereof. The carrier comprises a rigid portion which includes the one attachment member and a plurality of locking mechanisms, and a flexible portion which includes the two attachment members. The carrier is employed as an interface between the spacecraft and the cradle which assists the ejection restraint mechanism in dissipating the forces acting upon the spacecraft prior to launch.

In general, the ejection restraint mechanism acts as a tether connected between the cradle and spacecraft cargo which acts to establish a determinant state of force on the cargo and eliminate gapping at the pivot points prior to cargo deployment. The carrier is independent from the launch structure and thus is functionally easier to deal with. With proper positioning of the ejection restraint mechanism, pivots, cargo center of mass and force actuator, pivot and spring reaction forces remain unchanged during the release of the ejection restraint mechanism, thereby minimizing pivot bouncing and misalignment between the cargo angular momentum vector and the cargo static pivot axis. In addition, the severance of a single tether employed as the sole cargo release initiator rather than unlocking of multiple launch support mechanisms minimizes the potential for these devices to impart uncontrolled momentum to the cargo due to structural deformation energy.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DESCRIPTION OF THE PREFERRED EMBODIMENTS

Figure 1:
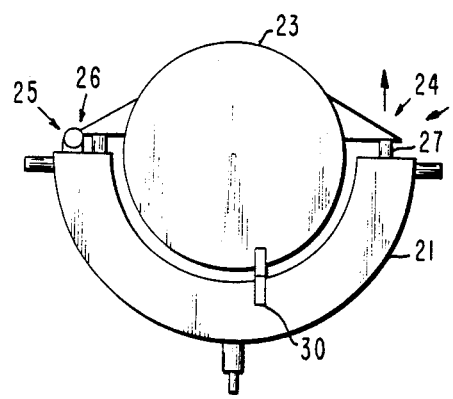
FIG. 1 shows a schematic illustrating the ejection restraint mechanism of the present invention incorporated into spacecraft launching apparatus.

Referring to FIG. 1 a schematic illustrating an ejection restraint mechanism 30 in accordance with the present invention is shown incorporated into a spacecraft support structure 20. The support structure 20 includes a spacecraft supporting cradle 21 having an open end. A spacecraft 23 is positioned to straddle the open end of the cradle 21.

The spacecraft 23 has at least one attachment member 24 on one side thereof and at least two attachment members 25, 26 on the opposite side thereof in longitudinally spaced positions. The attachment members 24, 25, 26 releasably engage the cradle 21 and support the spacecraft 23 in the open end thereof. The attachment members 24, 25, 26 generally define the corners of a triangle which encloses, with sufficient margin, the center of mass of the spacecraft 23. The structure 20 also includes an ejecting mechanism 27 having a part disposed between the cradle 21 and the one attachment member 24. The ejecting mechanism 27 is adapted to apply a tangential thrust force to one side of the spacecraft 23 at the location of the one attachment member 24.

A more detailed understanding of the launching structure in which the present invention may be employed may be had with reference to U.S. Pat. No. 4,359,201, entitled "Payload Deployment from Shuttle with Linear and Angular Velocity," which is incorporated herein by reference.

The ejection restraint mechanism 30 of present invention is a separable device having one end attached to the cradle 21 and the other end attached to the spacecraft 23. The ejection restraint mechanism 30 is adapted to restrain the thrust force applied to the spacecraft 23 for a predetermined time period in order to dissipate undetermined forces acting upon the spacecraft 23 prior to the ejection thereof.

As will be described in more detail hereinbelow, the ejection restraint mechanism 30 may generally comprise a separable resilient portion and a releasable clamp portion coupled thereto. The resilient portion may comprise a spring loaded anchor rod arrangement while the releasable clamping portion may comprise a spring loaded split ball clamp arrangement.

Figure 2A:
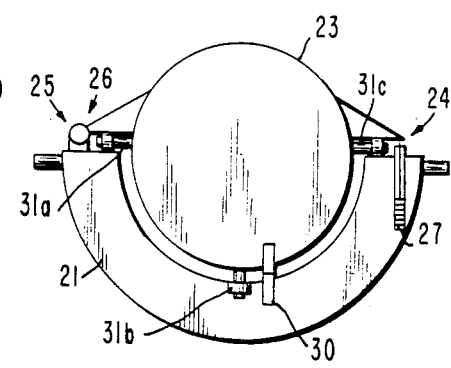
FIG. 2a, 2b and 2c illustrate the operation of the ejection restraint mechanism of FIG. 1.
Figure 2B:
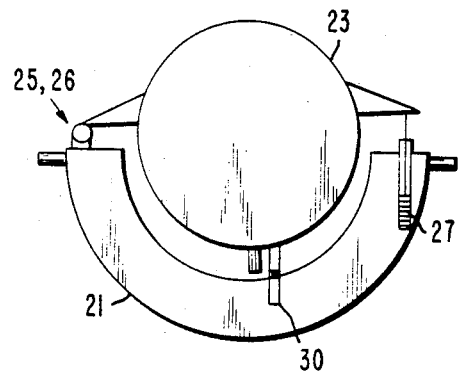
Figure 2C:
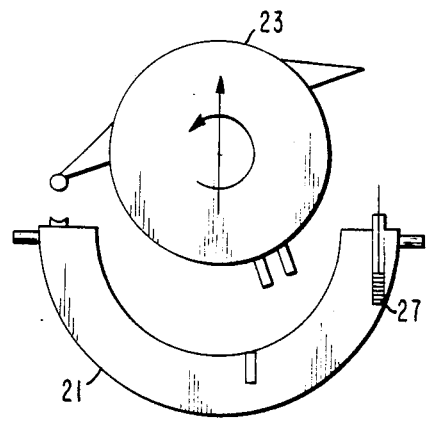

Referring to FIG. 2a, 2b and 2c, a sequence of illustrations is presented which show the operation of the ejection restraint mechanism 30 of FIG. 1. FIG. 2a shows the spacecraft 23 locked into a fixed position in the cradle 21 by means of a plurality of cradle release mechanisms 31a-c. The ejection restraint mechanism 30 is compressed due to the locked condition of the spacecraft 23.

FIG. 2b shows the cradle release mechanisms 31 having been disengaged which allows the ejecting mechanism 27 to exert a predetermined amount of force upon the spacecraft 23. In response to the force applied by the ejecting mechanism 27, the spacecraft rotates and translates slightly resulting in a downward force being applied to the cradle 21 at the pivot points located at the attachment members 25, 26.

The ejection restraint mechanism 30 curtails the complete ejection of the spacecraft 23 for a time period which allows the spacecraft 23 to fully engage the pivot points, thus eliminating gapping. During this time period, all undetermined forces resulting from such causes as pivot bouncing, thermal distortion and gravity load distortion of the support structure 20 are eliminated. In this manner, the potentially large, statically indeterminant forces due to racking exerted on the spacecraft 23 at the moment of deployment by the stiff support structure 20 are eliminated.

Accordingly, FIG. 2c shows the spacecraft 23 fully ejected from the support structure 20. To allow the full ejection of the spacecraft 20, the ejection restraint mechanism 30 is separated, and the resilient portion thereof stays attached to the spacecraft 23 while the clamp portion remains attached to the cradle 21.

More specifically, a plurality of cradle release mechanisms are released which allows the spring loaded ejection mechanism to cause the cargo to rise and rotate until the pivots are in contact with associated pads located on the cradle 21. This motion will continue until the ejection restraint mechanism 30 reaches its extension limit. After a specified settling time, the ejection restraint mechanism 30 is separated. The spring energy from the ejection mechanism 27 is then transferred to the spacecraft causing the desired ejection motion to occur.

Figure 3:
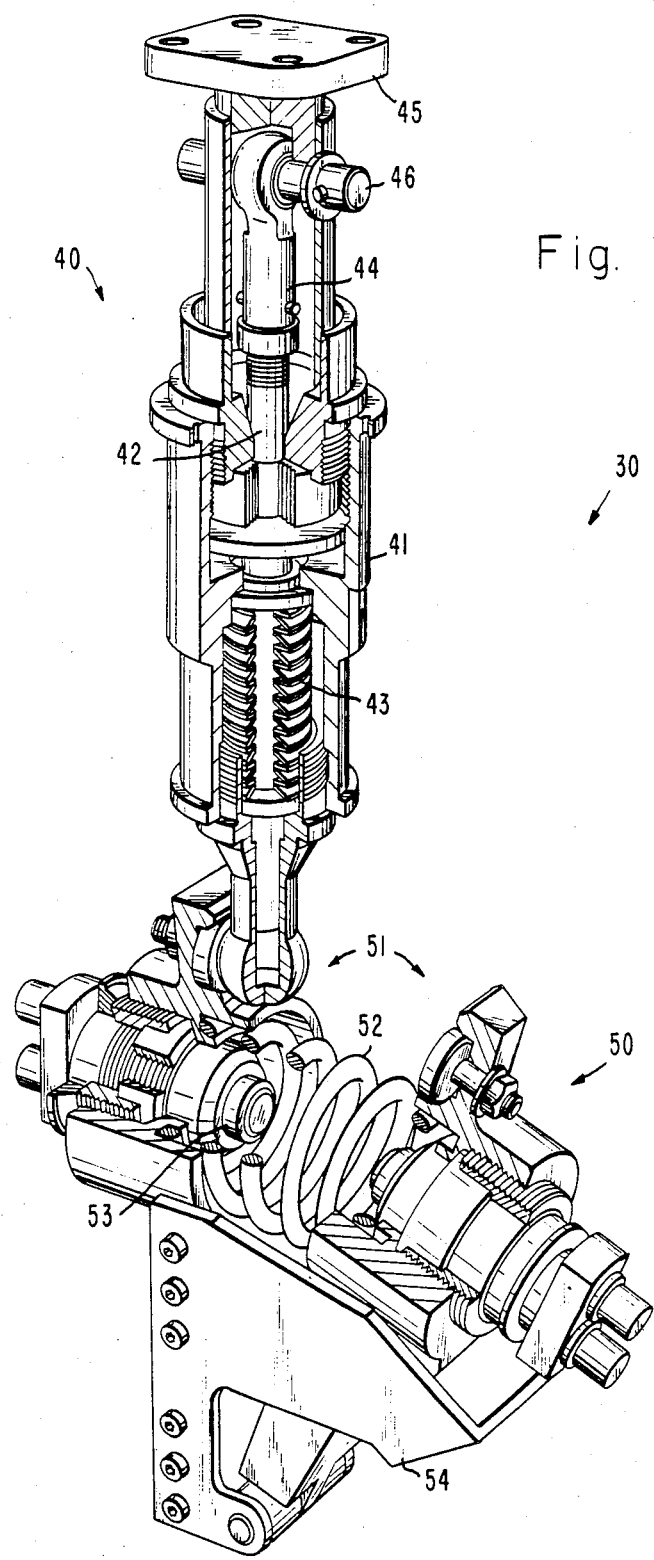
FIG. 3 illustrates a specific embodiment of an ejection restraint mechanism in accordance with the principles of the present invention.

Referring now to FIG. 3, an illustration of one specific embodiment of the ejection restraint mechanism 30 in accordance with the principles of the present invention is shown. This specific embodiment includes a resilient portion 40 comprising a generally cylindrical housing 41 in which is disposed a spring loaded anchor rod 42. The spring loaded anchor rod 42 comprises a compressible spring 43 which is coupled to an adjustable rod 44. One end of the resilient portion 40 has a base plate 45 which is employed to attach the restraint mechanism 30 to the spacecraft. The end of the anchor rod 42 adjacent to the base plate 45 is coupled to the base plate 45 by means of a pin 46 which extends through the end of the anchor rod 42 and the base plate 45. The other end of the anchor rod 42 is formed in the shape of a spherical ball.

The ejection restraint mechanism 30 also comprises a clamp portion 50 which comprises a spring actuated split ball clamp arrangement. The clamp portion 50 includes a housing 54 which is adapted to fasten to the cradle 21. The clamp portion 50 includes a split ball clamp 51 which is adapted to clamp the spherical end of the anchor rod 42. FIG. 3 shows the split ball clamp in a separated condition. A spring 52 is employed in a compressed condition surrounding a severable rod 53, which is shown in a severed condition in FIG. 3. The severable rod 53 may be a pyrotechnic bolt, or other such severable mechanism, which allows the split ball clamp 51 to be actuated on command.

More specifically, the ejection restraint mechanism 30, or tether, comprises a combination of a separable anchor rod 42 and spring clamp arrangement. The anchor rod 42 is attached to the spacecraft by means of an adjustable fitting which allows the rod 42 to be aligned with the ball socket interface. The other end of the rod 42 fits into the split ball clamp 51 which is attached to the cradle 21. The clamp 51 is spring loaded so that release of the severable rod 53 causes the anchor rod 42 to be released.

The operation of the ejection restraint mechanism 30 of FIG. 3 is straight forward. The anchor rod 42 is secured to the spacecraft by means of the base plate 45, while the clamp portion 50 is secured to the cradle 21. When the spacecraft is locked in position, the anchor rod 42 is moved to a downward position and the spring 43 is uncompressed. The split ball clamp 51 secures the spherical end of the anchor rod 42. Once the spacecraft is readied for launch, several locking mechanisms are released which secure the spacecraft to the cradle 21.

Accordingly, the ejection mechanism 27 attempts to eject the spacecraft from the cradle 21. However, the ejection restraint mechanism 30 prevents the full ejection of the spacecraft. The resilient nature of the anchor rod arrangement allows the spacecraft to move only slightly, which forces the attachment points to be in contact with pads at their associated pivot points. In addition, the spacecraft is allowed to settle into a static determinant equilibrium condition, thus eliminating the effects of unwanted forces acting on the spacecraft. After a predetermined time period, the clamp portion 50 is separated by means of pyrotechnic action, or the like, and the anchor rod 42 is released. Thereafter, the ejection mechanism ejects the spacecraft from the cradle 21.

Typically, spacecraft supporting structures, and the like, are rigid systems, adapted to support the weight of the spacecraft as well as assist in the ejection function. However, in order to obtain optimum performance from the ejection restraint mechanism of the present invention, a less rigid supporting structure is more advantageous. Accordingly, the present invention provides for a carrier structure which may be employed in conjunction with the ejection restraint mechanism to assist in spacecraft deployment.

Figure 4:
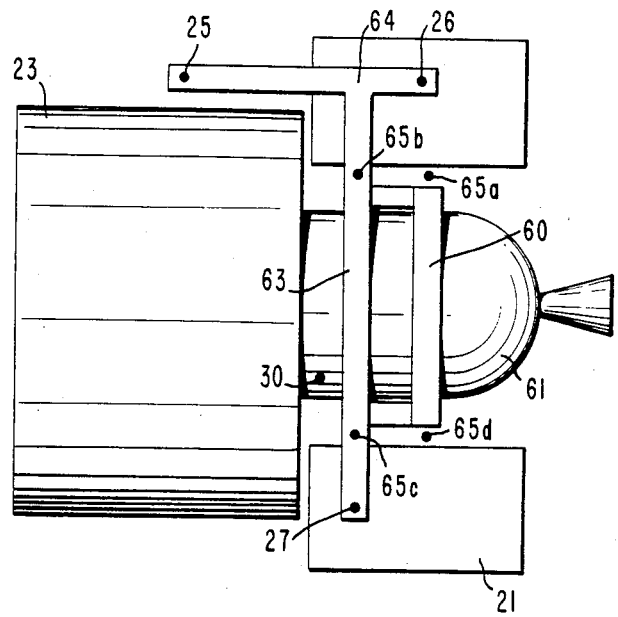
FIG. 4 illustrates a top view of a carrier in accordance with the principles of the present invention.

Referring to FIG. 4, a top view of a carrier 60 in accordance with the principles of the present invention is shown. The carrier 60 is shown fastened to a perigee thrust motor 61 of the spacecraft 23. The carrier 60 comprises a rigid central section 63 and a flexible pivot section 64. The pivot section 64 is cantilevered so that it has some resilience and hence assists in allowing the spacecraft 23 to reach equilibrium in conjunction with the ejection restraint mechanism of FIG. 3.

The carrier 60 is disposed between the spacecraft 23 and the cradle 21 and is thus employed to secure the spacecraft to the cradle 21 prior to ejection. This is accomplished by means of a plurality of launch locking mechanisms 65a-d whose placements are identified in FIG. 4. These devices are generally well known in the art and are described in some detail in the publications identified in the Background of this disclosure. In addition, the locations of the attachment members described with reference to FIG. 1 are shown but not described in any detail.

In the particular implementation shown in FIG. 4, the carrier 60 is physically attached to the perigee thrust motor 61. Once the motor 61 is no longer needed it is ejected from the spacecraft 23, and hence the carrier is expelled along with the motor. This lessens the weight of the spacecraft 23 significantly and permits more efficient operation of the spacecraft 23 while in orbit.

To better understand the principles of the present invention, the basic principles of operation of the so-called "frisbee" launch ejection system are discussed below. Reference is hereby made to U.S. Pat. No. 4,359,201, entitled "Payload Deployment From Shuttle with Linear and Angular Velocity," cited above in the Background of the Invention section of this document, which discusses the principles of operation of the frisbee ejection system in detail.

The frisbee ejection system is designed to impart a small spin rate about the payload bearing axis (physical axis of symmetry) as well as impart the necessary separation velocity to the payload relative to the launch vehicle. The initially acquired angular momentum serves to bound the attitude transients as the payload drifts away from the launch vehicle. This is accomplished because the payload is moving with a known, stable spin motion. Direct precession of the payload bearing axis as a result of undesired tip-off rates imparted by the release process is precluded. In addition, attitude uncertainty produced during subsequent maneuvers is diminished.

The primary elements of the frisbee ejection system are three in number. On one side of the payload to be ejected are two protrusions, or pivots, which sit in mated receptacles located on the launch vehicle. The third element of the ejection system is located diametrically opposite the pivots. The third element is comprised of an active separation force element, mounted on the launch vehicle, which pushes on a receptacle located on the vehicle. This third element may be thought of as a coiled spring. When the spring is uncaged, the force applied to the payload causes the pivots to rotate down into their seats. The payload rotates about the line connecting the two pivots as it accumulates both linear and rotation rate. When the spring exhausts its stroke, the payload translates from the launch vehicle, while spinning.

It is desired that the spin rate be established principally along the symmetry axis of the payload. It is difficult to ensure that the axial position of the spring will be coincident with the axial position of the payload center of gravity. Also, any offset between these locations will result in rate being accumulated transverse to the symmetry axis (tip-off rate). Accordingly, the second pivot is included in the system to allow some latitude in the positioning of the payload center of gravity, since the action of the two pivots can counteract any pitch moment introduced by the offset of the spring from the center of gravity. However, the elements of this three point frisbee separation system must be positioned properly relative to the system center of gravity in order for the pivot mechanism elements to achieve a zero tip-off rate at separation.

An investigation of the rigid body dynamics of a frisbee separation proves insightful as to the guidelines for positioning the pivot mechanisms. The steady state values for the pivot reaction forces which preclude any undesirable pitch tip-off rate introduced at separation can be obtained from an analysis of the separation event in which impulses, rather than forces, are assumed to act on the payload. Furthermore, this idealized analysis assumes an axisymmetric, rigid body payload ejecting from a second body of infinite mass and inertia. The pivot supports are assumed to be infinitely rigid and the ejection spring delivers its force impulsively.

Vector equations for the rotational motion and translational motion may be related through a third equation which couples the rotational rate with the linear rate. This yields the three equations in three unknowns, the impulsive reactions at the pivots, $R_1$ and $R_2$ and the spin rate $\omega_s$.

For the special case for which the pitch tip-off rate of the payload is zero, a condition representing optimum separation performance, the state equations may be used to relate the pivot impulse to that of the spring, as follows, $$I_3\omega_s + r_1 R_1 + r_2 R_2 = R_s r_s \quad (1)$$

$$-h_{cm}R_1 + (d - h_{cm})R_2 = R_s(h_{cm} - h_s) \quad (2)$$

$$mr_s\omega_s = R_1 + R_2 + R_s \quad (3)$$

These may be thought of as the roll, pitch and linear rate equations, respectively. For simplicity, it is assumed that $r_1 = r_2 = r_s = r$. Further, two useful general parameters related to the overall mass properties of the payload may be defined as follows, $$\beta^2 = I_3/mr^2 \text{ and } \gamma = (1-\beta^2)/(1+\beta^2) \quad (4)$$

where $I_3$ is the spin moment of inertia of the payload. Then, equations (1) and (2) can be solved for the compression forces required to yield the zero tip-off optimum condition, $$R_1/R_s = \gamma - (\gamma - 1)h_{cm}/d + h_s/d \quad (5)$$

$$R_2/R_s = (\gamma + 1)h_{cm}/d - h_s/d \quad (6)$$

It is clear from these equations that the sum of the reaction impulses is equal to $\gamma$ times the spring impulse, as might be anticipated for a payload which is rolling as well as translating.

Equations (5) and (6) yield compression forces (positive as defined herein) over a range of values of $h_{cm}$, the location of the vehicle center of gravity. For the values of $h_{cm}$ large, or for negative values of $h_{cm}$, one of the two pivots must yield a tension impulse, which is not possible without building a roof structure over the pivot seat. In the event that the value of $h_{cm}$ yields tension pivot reactions, the state equations can be solved for the induced tip-off rate and associated momentum vector tilt.

Therefore, this analysis yields the pivot reactions and momentum tilt as a function of center of gravity position. Further analysis of these equations indicates that the center of gravity of the system should fall within the bounds of a triangle which is slightly smaller than the triangle defined by the three pivot points. Meeting this criterion, the pivot impulse reactions can be generated to yield a zero tilt separation.

The desirability of having pivots of a three point ejection system reacting just those forces consistent with a low tilt separation has been described above. The ejection restraint mechanism of the present invention acts as a hold-down, or tethering element, during the first half of a two stage release, so that an initial, small expenditure of the spring energy serves to achieve the pre-loaded condition of the pivots. In this way, the transient dynamics that may occur from either a very stiff pivot interface compliance or a racking or twisting of the plane describing the interface connecting the payload to the carrier, is allowed to settle out during the first stage of the release in which the payload is restrained by the ejection restraint mechanism. The actual release is then accomplished by severing the mechanism, allowing the payload to separate from the launch vehicle.

The pivot reaction forces are generated so that their sum is $\gamma$ times the spring force of the ejection restraint mechanism is radially positioned outboard toward the ejection force actuator, such that $$rF_p + r_T F_T = rF_s \quad (7)$$

In steady state, $$F_T + F_p + F_s = (1 + \gamma)F_s \quad (8)$$

Equation (7) can be solved for the radial location of the ejection restraint mechanism as, $$r_T/r = (F_s - F_p)/F_T = (1 - \gamma)/(1 + \gamma) = \beta^2 \quad (9)$$

In the pitch direction, it is desired that the ratio of the forward to aft pivot force be undisturbed by the release of the ejection restraint mechanism, and this may be accomplished by placing the mechanism axially at the location of the center of gravity. It thereby provides no pitch moment about the payload center of gravity during the time it is restraining the payload and the pivot reaction forces will be the same whether the mechanism is intact or not.

Thus, an ejection restraint mechanism and a flexible carrier system for use in assisting the ejection of a spacecraft or other device from a launch vehicle has been described. It is to be understood that the above-described embodiments are merely illustrative of some of the many specific embodiments which are representative of applications of the principles of the present invention. Clearly, numerous and varied other arrangements may be readily devised by those skilled in the art without departing from the spirit and scope of the invention.

What is claimed is:

1. Apparatus for use in the gyroscopic ejection of a spacecraft from a support structure, said support structure comprising a spacecraft supporting cradle having an open end, said spacecraft straddling said open end, said apparatus further comprising an ejecting mechanism for applying a tangential thrust force to one side of said spacecraft, said apparatus comprising:

a separable ejection restraint mechanism having one end attached to said cradle and the other end attached to said spacecraft for restraining said thrust force applied to said spacecraft for a predetermined time period in order to dissipate undetermined forces acting upon said spacecraft prior to the ejection thereof.

2. The apparatus of claim 1 wherein said ejection restraint mechanism comprises a separable resilient portion and a releasable clamping portion coupled thereto.

3. The apparatus of claim 2 wherein said resilient portion comprises a spring loaded strut arrangement and said releasable clamping portion comprises a spring loaded split ball clamp arrangement.

4. The apparatus of claim 1 wherein said spacecraft further comprises a carrier portion disposed in contact with said cradle, said carrier portion comprising one attachment member on one side thereof and two attachment members on the opposite side thereof in said longitudinally spaced positions.

5. The apparatus of claim 4 wherein said carrier portion comprises a rigid portion comprising said one attachment member and a flexible portion comprising said two attachment members.

6. Apparatus for the gyroscopic ejection of a spacecraft from a support structure, said support structure comprising a spacecraft supporting cradle having an open end, said spacecraft having at least one attachment member on one side thereof and at least two attachment members on the opposite side thereof in longitudinally spaced positions, said spacecraft straddling said open end and said attachment members releasably engaging said cradle and supporting said spacecraft in the open end of said cradle, said attachment members defining the corners of a triangle which substantially encloses the center of mass of said spacecraft, said apparatus further comprising an ejecting mechanism having a part disposed between said cradle and said one attachment member to apply a tangential thrust force to one side of said spacecraft at the location of said one attachment member, wherein the improvement comprises:

a separable ejection restraint mechanism having one end attached to said cradle and the other end attached to said spacecraft for restraining said thrust force applied to said spacecraft for a predetermined time period in order to dissipate undetermined forces acting upon said spacecraft prior to the ejection thereof.

7. The apparatus of claim 6 wherein said ejection restraint mechanism comprises a separable resilient portion and a releasable clamping portion coupled thereto.

8. The apparatus of claim 7 wherein said resilient portion comprises a spring loaded strut arrangement and said releasable clamping portion comprises a spring loaded split ball clamp arrangement.

9. The apparatus of claim 6 wherein said spacecraft further comprises a carrier portion disposed in contact with said cradle, said carrier portion comprising said one attachment member on one side thereof and said two attachment members on the opposite side thereof in said longitudinally spaced positions.

10. The apparatus of claim 9 wherein said carrier portion comprises a rigid portion comprising said one attachment member and a flexible portion comprising said two attachment members.

* * * * *